United States Patent [19]

Thompson

[11] Patent Number: 4,539,614

[45] Date of Patent: Sep. 3, 1985

[54] FLEXIBLE MAGNETIC DISK CLAMPING AN INJECTOR MECHANISM

[75] Inventor: Herbert E. Thompson, Los Gatos, Calif.

[73] Assignee: Drivetec, Inc., Milpitas, Calif.

[21] Appl. No.: 495,801

[22] Filed: May 18, 1983

[51] Int. Cl.3 ........................ G11B 17/04; G11B 23/04

[52] U.S. Cl. ........................................ 360/99; 360/86; 360/97; 369/270

[58] Field of Search ..................... 360/86, 97, 99, 133, 360/135, 137; 369/77.1–77.2, 261, 270, 271

[56] References Cited

U.S. PATENT DOCUMENTS 4,097,908 6/1978 Chou et al. ........................... 360/76
4,420,830 12/1983 Green .................................. 369/261
4,445,156 4/1984 Fujimoto .............................. 360/99

*Primary Examiner*—Stuart N. Hecker
*Assistant Examiner*—David J. Severin
*Attorney, Agent, or Firm*—Claude A. S. Hamrick

[57] ABSTRACT

A floppy disk drive mechanism includes a clamping lever which is turned to align the floppy disk with a drive spindle and clamp it thereto. The clamping lever is not accessible until the disk has been fully inserted into the drive mechanism thus minimizing damage as may occur by operating the clamping mechanism when the disk is not fully inserted. Further, turning of the accessible handle causes a rotational clamping device to be moved vertically downward along a line perpendicular to the plane of the floppy disk so as to further align the disk with the drive spindle and clamp it thereto. The clamping lever also is not accessible when in the fully clamped condition. An overcenter link holds the clamping mechanism in the fully clamped condition and a lock-out prevents ejection of said disk during operation. By pushing a release button, the over-center link is disengaged and a spring-loaded mechanism unclamps the clamping mechanism and raises the read/write head free of the disk. The spring-loaded mechanism includes a member that strikes the disk driving it partially out from the drive mechanism so that it can be readily removed. At the same time, the clamping lever is returned to its recessed, rest position.

26 Claims, 9 Drawing Figures

72 74 78 74 82 76 74 74 72
66 64 64 66 86
90

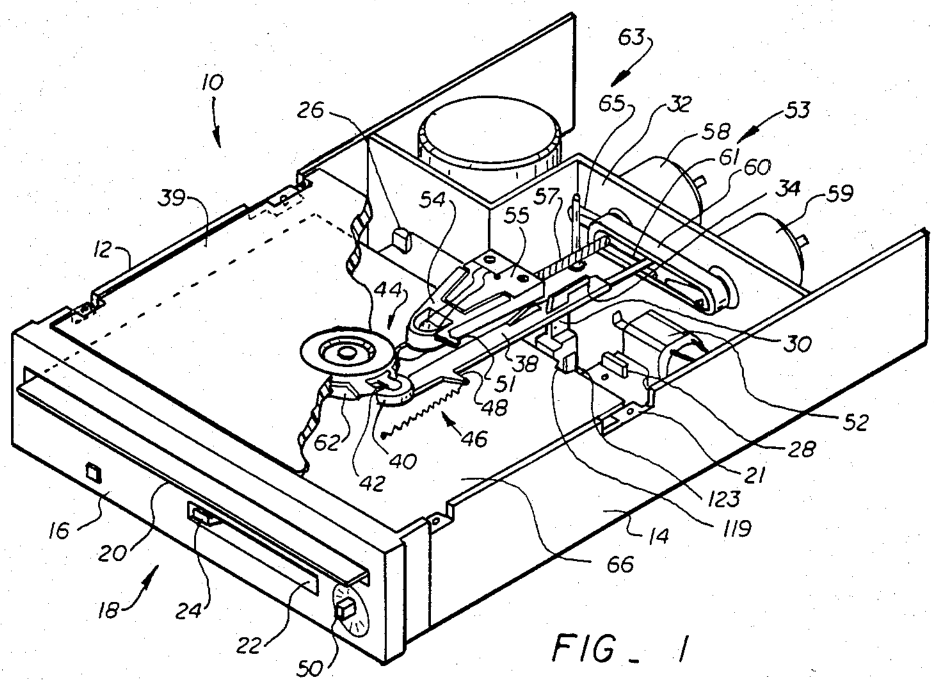
FIG_ 1
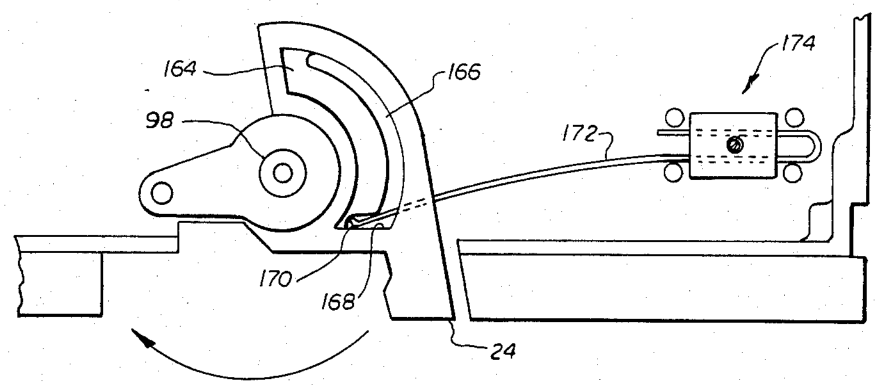
FIG_ 7

79
78
82
76
80
94
62
97
95
86
88
84
92
64
95
97
72
66

90

72
74
78
82
76
66
64
86

90
92

68
72
74
73
70
75
34

78
44
38
36
43
41
48
79
42
40

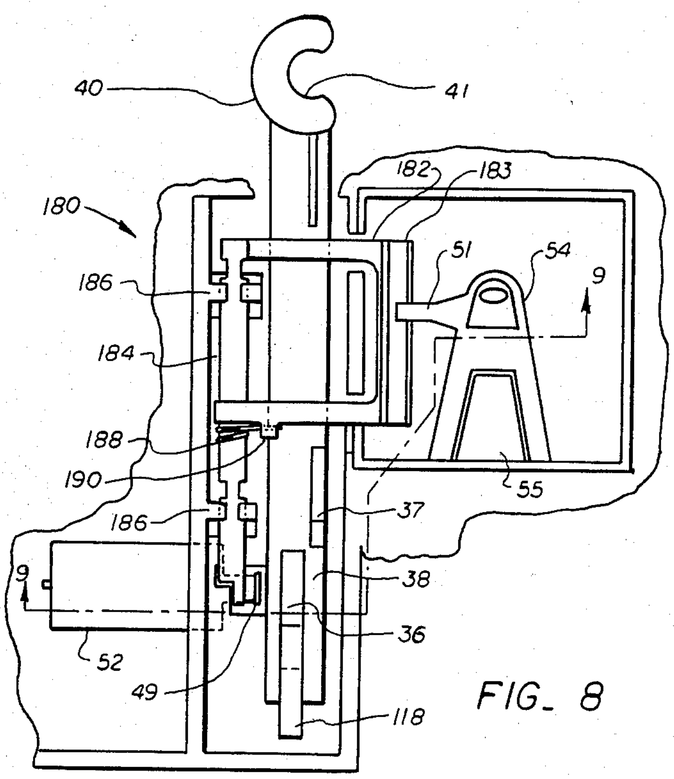
FIG_ 8
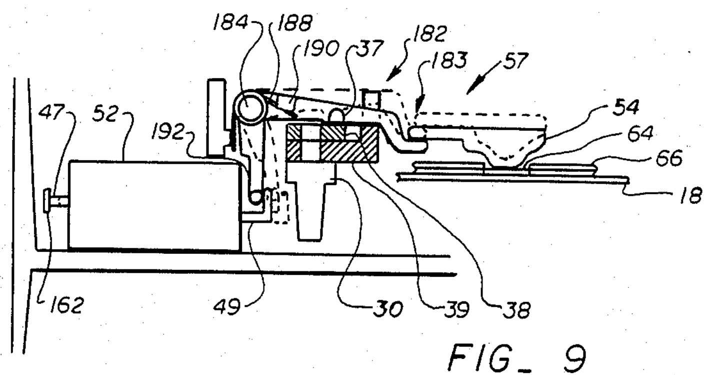
FIG_ 9

FLEXIBLE MAGNETIC DISK CLAMPING AN INJECTOR MECHANISM

BACKGROUND OF THE INVENTION

1. Field of the Invention

This invention relates to disk drive assemblies which permit edge loading for effecting insertion and removal of interchangeable recording cartridges, which house flexible magnetic recording disks, from a loading slot; and more particularly, to an arrangement for centering and clamping the disk to a drive hub following full insertion into said loading slot, and unclamping the disk and providing an ejection force to partially eject said cartridge from said slot to facilitate removal of said cartridge.

2. Description of the Prior Art

Because of extensive improvements in drive aparatus, the use of flexible magnetic disks have become commonplace in word processing, small digital computers used in industry and personal computers. The flexible magnetic recording disk, sometimes called a floppy disk or diskette cartridge, is a MYLAR disk enclosed in a plastic envelope having a central aperture for engagement of the disk and having a radial aperture which permits access to the disk surface by the read/write head. Magnetic material is secured to the faces of the disk so as to provide the recording surfaces. A central aperture in the disk is smaller than that of the plastic envelope and this allows the magnetic disk to be rotatably driven while enclosed in the envelope, which protects the recording surface and decreases contamination. This provides a low-cost flexible, removable magnetic storage disk for use in low-cost miniature direct access storage devices which read and write information on the flexible disks. The low-cost, interchangeability and ability to access on a random basis data stored in the magnetic surface are factors which have lead to the extensive use of these data storage devices. But centering and clamping of the flexible disk during loading into the disk drive without adversely effecting the concentricity of the tracks has been a problem. Further, considerable effort has been expended toward the reduction in size of the disk drive assemblies.

In a prior art flexible magnetic disk drive apparatus of the type used in the data processing industry, a rigid disk positioner, having a flanged head and a truncated, cone-shaped lead surface is mounted to the door of the apparatus. The positioner is capable of being actuated such that the lead surface passes through the central opening of a magnetic disk and into a recess in a drive spindle. Further movement of the positioner stretches the disk opening and slides the disk toward the flanged head of the positioner so as to clamp the disk to the front surface of the spindle. In such a device, a slight annular spacing occurs between the outer surface of the positioner and the wall defining the recess in the spindle which tends to cause improper registration of the disk with the spindle and hence, a corresponding eccentricity in scribing the tracks of the disk.

Another prior art device utilizes a drive spindle including a hub having an inner wall defining a recess therein and a face portion for supporting the disk, expandable means for expanding against the inner wall of the hub before clamping the disk to the face portion of the hub, and also including means for wedging the expandable means into its expanded position.

Another prior art device utilizes a cartridge guide to direct the cartridge during its insertion toward the spindle. Such a device typically employes a door fixed to the cartridge guide by means of cams or linkages so that when the door is closed the cartridge is moved into registration with the drive spindle. But rapid door closure may cause clamping to occur before the cartridge is properly registered.

In yet another prior art device, an apparatus for clamping and centering a flexible magnetic disk is provided which includes a spindle-clamping assembly that is mounted to the door of the device and which utilizes a helical clamp spring to force the clamping assembly into the spindle when the door is closed. However, such clamp springs occupy a relatively large space and their use is limited to relatively large disk drives.

Examples of prior art devices are found in U.S. Pat. No. 3,678,481, entitled "Data Storage Apparatus Employing a Single Magnetic Disk", by Warren L. Dalziel, Jay B. Nilson and Donald L. Wortner; U.S. Pat. No. 3,609,722, entitled "Center Sealing Data Disk Cassette and Processing Machine", to George E. Zenzeflis; and U.S. Pat. No. 3,768,815, entitled "Apparatus for Clamping and Centering a Flexible Magnetic Disk", by Edward L. Mathurion.

The devices of the prior art include one or more of the following, which adversely affect their usefulness in small computers; the clamping assembly is hinge mounted which requires additional space and can cause problems in centering and clamping; and the use of a hinged door fixed to the cartridge guide for moving the cartridge into registration.

SUMMARY OF THE PRESENT INVENTION

It is an object of this invention to provide a simple method for centering and clamping a floppy disk in a disk drive assembly.

It is a further object of this invention to provide a simple method for unclamping and partially ejecting the floppy disk from said disk drive assembly.

It is another object of the invention to insure that the floppy disk is fully inserted before clamping action can be effected, thus, preventing damage to the surface of said disk.

Briefly, a centering, clamping and ejection mechanism for a disk drive assembly, which employs flexible magnetic disks, includes a face plate, a disk guide slot in said face plate for edge loading of said magnetic disks, and end stops which signify that the disk is fully inserted. Prior to insertion of the floppy disk, a clamping handle is hidden in a recess of the face plate. The clamping handle is connected to an over-center link which is also connected to a slideably engagable link all of which are in parallel with the plane of the floppy disk, except for a vertical extension of said slideably engageable link, which intersects the plane of the disk upon insertion just prior to its reaching the end stops. By fully inserting the disk, engagement with the vertical extension actuates the linkage and moves the clamping handle out of the recess so that it is in an accessible position. Moving the clamping handle into the clamping position continues the forward movement of the linkage and the vertical extension now intersects a parallel linkage above the plane of the diskette, the linear motion of which causes a rotatable clamping member to be driven down against the diskette providing centering before clamping of the diskette to the drive hub. The lower and upper linkages are spring-loaded so as to cause release of the clamping member except when the linkage is in the over-centered locked position. A release button in the face plate disengages the lock and the spring force unclamps the rotating clamping member and upon its return, the vertical extension strikes the front edge of the diskette forcing it out from said slot where it is accessible for removal. At the same time, the spring forces cause the clamping handle to be returned to the recessed, unclamped position.

IN THE DRAWING

FIG. 1 is a partially broken perspective view of a disk drive in accordance with this invention illustrating insertion of the disk, the rotationally driven clamping rotor and the upper link of the clamping and ejection mechanism;

FIG. 7 is a plan view of the clamping handle (24) illustrating spring guide slot (168) and wire spring (172) which retains clamping handle (24) in its unclamped, recessed position;

FIG. 8 is a top plan view which illustrates the relationship of the upper link (38), carriage record/playback head lifter (180) and carriage head assembly (54); and FIG. 9 is a cross-section along the lines 9—9 of FIG. 8.

DETAILED DESCRIPTION OF THE PREFERRED EMBODIMENT

Figure 2:
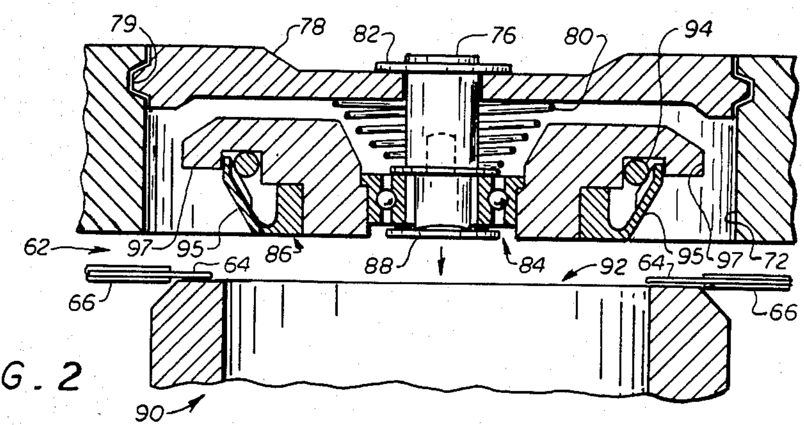
FIG. 2 is a side view of the stator, rotor and drive spindle in the unclamped condition.

Referring now to FIG. 1, a disk drive assembly which includes the centering, clamping and ejection features of the instant invention is shown at 10 and includes a frame having side walls 12 and 14, a front end 15 and a face plate 16 connected to said front end of the frame. A disk cartridge 20, hereinafter generally referred to as a disk, may be inserted into the disk drive assembly via guide slot 18 in the face plate 16. In FIG. 1, disk 20 is shown to be almost fully inserted into the disk receiving area of the disk drive assembly. At the left edge of the guide slot, a guide surface (not shown) is provided for disk alignment and disk guide spring 21 maintains the left edge of the disk against the guide surface. The end of a clamp handle 24 appears in clamp handle recess slot 22 and is inaccessible until the rear edge of disk 20 is seated against end stops 26 and 28.

In moving the disk toward the rear from the position shown, the rear edge of the disk engages with the cartridge engaging surface 114 of the vertical extension 30 of the lower link 108 (see FIG. 5) and, as will be described in more detail hereinafter, this rearward (backward) motion of the vertical extension causes the pivotally mounted clamp handle 24 to be rotated such that the clamp handle is accessible at the time the disk is properly aligned against the end stops 26 and 28. Further rotation of the clamp handle toward the clamping position, causes the vertical extension 30 to engage the rear portion 34 of slot 36 in upper link 38 which is designed to slide in a guide slot 73 in the top cover 39 (see FIG. 4), and in a parallel plane with the disk so as to translate the linear motion of the upper link 38 into rotational motion of the threaded clamping member 44. Clamping member 44 has a knob 42 attached in a threaded portion 79 of the exterior outer diameter of the threaded clamping member 44 which knob is engaged with the portion 40 of link 38. The clamping motion is resisted by the coil spring 46 which has one end thereof connected to the lateral spring support member 48 of upper link 38. The forward end of the coil spring 46 is connected to a lateral spring support which is attached to the cover, within the broken portion and is not shown.

Disk drive systems that record data on and read data from flexible magnetic disks, or floppy disks as they are commonly known, are composed of several elements. The floppy disk itself is a thin MYLAR or polyester disk that is coated with a magnetic material that is enclosed in a protective envelope having access holes for spinning the disk and for accessing the magnetic surface. Disk spinning is accomplished by a motor driven spindle such as 90 (FIGS. 2 and 3), while access to the magnetically encoded data is provided by a magnetic record/playback head attached to a carriage that is positioned radially along a guide track by a drive mechanism. Some of these elements have been previously discussed. Referring to FIG. 1, a magnetic head carriage and drive assembly 53 is shown. Head assembly 54 carries the record/playback head which is brought in contact with the floppy disk via the radial aperture during record or playback functions. The head assembly 54 is pivotally mounted to the head drive 55 which is moved linearly by lead screw 57 and driven by stepper motor 58. Head carriage guides are employed to prevent rotation of the head during its linear movement and one such guide is partially shown at 61. In order to increase the density of recording, it is necessary to precisely position the head so as to access tracks that are very closely spaced. To this end a second stepper motor 59 is adapted to provide a vernier drive to the linear multiplier assembly 60. This allows for course positioning by stepper motor 58 and precise positioning by venier adjustment using stepper motor 59 and multiplier assembly 60 to adjust the position of the armature. This axial movement is obtained by driving one end of multiplier 60 with motor 59 while the other end pivots about pin 65. A head positioning arrangement similar to that described hereinabove has been disclosed in a U.S. patent application Ser. No. 348,831, now abandoned, which is assigned to the same assignee as the instant invention.

As is common with the head carriage assemblies, the record/playback head assembly 54 is spring biased toward the surface of the disk by a spring on the underside of the assembly not shown. For insertion or removal of the floppy disk, the head assembly 54 must be raised so as to be free and clear of the cartridge 66. The manner in which this is accomplished will be discussed in detail later. Further details of the construction and operation of a magnetic head carriage assembly which may be used successfully in the instant invention, are more completely described in co-pending U.S. patent application Ser. No. 428,936, entitled "Magnetic Record/Playback Head Positioning Apparatus", by Herbert E. Thompson, filed Sept. 30, 1982, and is incorporated herein by reference.

Figure 3:
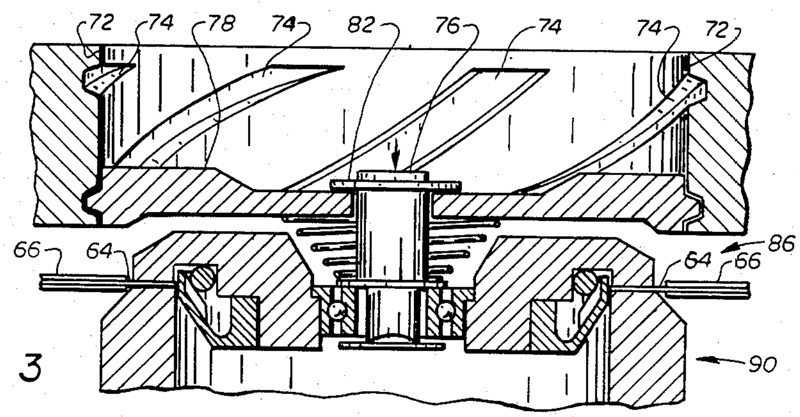
FIG. 3 is a side view as in FIG. 2, but in the clamped condition.
Figure 4:
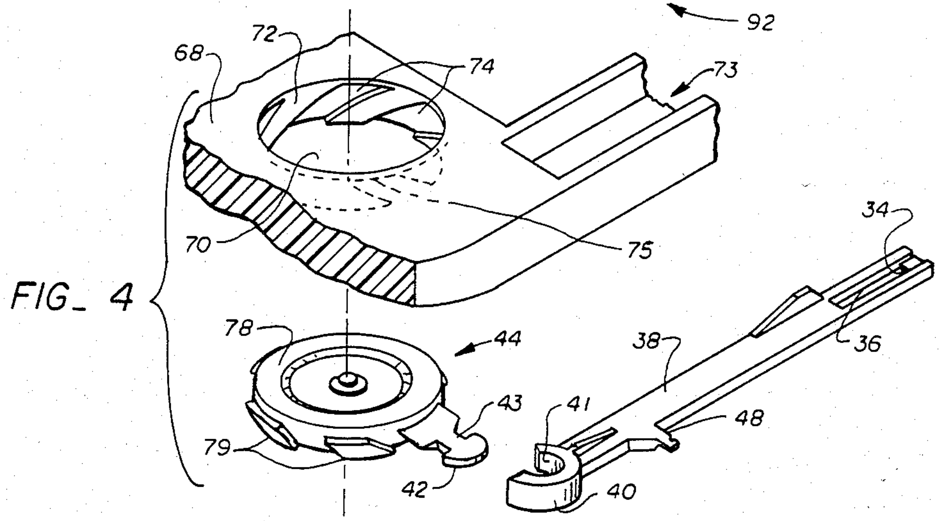
FIG. 4 is an exploded perspective view generally illustrating the interrelationship of the stator, rotor and upper linkage for converting linear motion of the upper link into rotational motion of the rotor used to clamp or unclamp the disk.

The novel manner in which the centering and clamping action is obtained may be best understood by reference to FIGS. 2, 3, and 4. As may be seen, a stator 68 is formed in the cover which includes a cylindrical aperture 70 having interior walls 72 which include helical grooves 74 therein. A rotor 78 has an upper cylindrical surface which includes threaded portions 79 which are adapted to mate with the grooves 74, thus permitting a vertical translation as the rotor 78 is rotated. This rotational motion is accomplished by a linear motion of linkage 38 which includes an arcuate member 40 having a knob engaging surface 41 adapted for engagement with rotator knob 42 that is attached to a threaded portion of rotor 78. In order to accomodate the rotary motion of rotor 78 and to permit insertion and removal of the rotor 78 from the cylindrical aperture 70, one of the helical grooves is cut out as shown at 75, FIG. 4, except for a holding or stop portion near the top surface of the cover. This allows the passage of the threaded extension 43 into the upper link guide slot 73, partially shown, and, as the rotor turns, permits the necessary rotational relationship between knob 42 and rotor 78. It also permits the interconnection between knob 42 and upper link 38 by which the rectilinear motion of link 38 causes rotation of rotor 78.

Referring now to FIG. 2, it may be seen that clamping member 44 is in its top most position. The clamping member includes a collet shaft 76 to which a rotor 78 is attached and held in position by an E-ring 82. The rotational centering and clamp assembly 86 is rotatably connected to the lower portion of collet shaft 76 by means of a ball bearing assembly 84, and is held in spaced relation from rotor 78 by spring force provided by spring 80 between the bottom surface of rotor 78 and the upper portion of the bearing race of bearing assembly 84. It is to be noted that bearing 84 is loose fitting about collet shaft 76, but is prevented from excessive movement by frictional engagement with wave washer 88 which holds the clamping assembly in position. This assembly allows the rotational centering and clamping assembly to move about so as to engage the center aperture of the disk and guide it into clamping position with the drive spindle 90 without damage to the disk. Spindle 90 extends through aperture 99 of support member 96.

A disk 64 is shown in position for centering and clamping to the drive spindle 90, the disk is resting on the abutment surface 91 of the spindle 90, and as shown is slightly off center. The spindle has a recess 92 that has an inner wall 93. The ball bearing assembly 84 and the chamfered centering members 95 enter recess 92 during the clamping operation. As the handle 24 is rotated toward the clamping condition, the chamfered surfaces 95 of the clamping member 44 engage with the central aperture 62 of the disk 64 and the recess 92 on drive spindle 90 as illustrated in FIGS. 2 and 3. Because of the manner in which clamp assembly 86 is constructed, the assembly adjusts to the disk aperture and aligns it with the spindle aperture 92. A circular resilient member 94 tends to force the chamfered centering members 95 outward against inner wall 93 of said recess. Member 94 has a certain degree of flexibility so as to insure that the recording disk is held in a centered relationship with respect to the recording assembly. Clamping surfaces 97 are driven down against the centrally exposed surface area adjacent aperture 62 of disk surface 64 so as to clamp the disk against the abutment surface 91 of drive spindle 90. As may be seen, the clamping motion is directionally at right angles to the disk surface and does not provide a transverse motion as is obtained in the prior art units which are hinged. In addition to avoiding the arcuate motion caused by the hingedly coupled clamping members used in prior art units, another advantage of this disk drive assembly is the reduction in space required. Thus, the unit is not only smaller, but it is designed to obtain a better result. Rotational motion of the clamped disk 64 is provided by drive motor 63 which is interconnected with drive spindle 90 in a well known manner to turn said disk.

The manner in which the clamping and ejector forces operate may be better understood by reference to FIGS. 1, 4, 5, 6, and 7. With respect to the application of clamping force, the disk is inserted in disk guide slot 18 and is pushed into the slot until it engages the end stops 26 and 28. By this action, the rear edge of the disk engages the cartridge engaging surface 114 of vertical extension 30 of lower link 108 causing it to move backward which action moves the over-center link 102 causing handle 24 to pivot about pin 100 which is fastened to support member 96 through aperture 98. This causes the handle to move out of the recess where it is accessible to the operator.

At this same time, the rear edge 116 of vertical extension 30 of lower link 108 is in engagement with the rear portion 34 of slot 36 in upper link 38; and, as the operator moves the handle into the clamping position, the handle continues to pivot around pivot pin 100. Over-center link 102 is pivotally connected at one end to handle 24 by means of pivot pin 104 which allows an arcuate motion as the handle is rotated. At the other end, link 102 is pivotally attached by means of pivot pin 106 to link 108. Link 108 is slideably attached to the bottom of horizontal frame support member 96 by means of guide members 110 and 112. Thus, as the handle 24 is rotated toward the clamping condition, it causes a backward motion of over-center link 102. The motion of link 102 then causes a backward motion of link 108 which forces the upper link 38 backward. As was explained hereinabove, this motion of the upper link 38 causes the threaded rotor 78 of clamping member 44 to rotate down through the helical grooves 72 so as to bring the clamp assembly 86 into position to center and clamp the disk to spindle 90. The spring pressure applied by coil spring 46 will cause the clamping handle to rotate to the unclamped position unless the over center link 102 is moved to its over-center position, which occurs only at the time the disk is firmly clamped.

Before the disk drive assembly can become fully operational, the status of two separate interlocking conditions must have been determined. The first condition relates to the write protect status of the floppy disk. As is well-known, a write-protect notch such as is shown at 119, FIG. 1 is formed in the end of the plastic envelope which encloses the magnetic recording disk and, so long as the notch is uncovered, the information on the disk is not to be changed, i.e., it is to be protected. If the notch is covered the information on the disk may be changed or additional information may be stored on the disk. In order to recognize the disk protect status and relay this information to the associated microprocessor control circuitry on circuit board 120, a write-protect assembly is employed; said assembly comprising upward extension 123 and position tab 124 both of which are attached to spring loaded assembly 125 that is pivotally mounted to support member 96. Extension 123 is positioned to intersect notch 119 and when the notch is not covered extension 123 simply rests in notch 119 when the disk 20 is fully inserted. The processor circuitry recognizes this condition and prevents the changing of stored information. Not only does it protect the stored information, but it also prevents the storage of additional information on the disk. Thus, no changes of existing information nor additions of new information are permitted. However, when the notch is covered, extension 123 is engaged prior to full insertion of the disk against end stops 26 and 28. Extension 123 is thus forced backwards causing rotation of the pivotally mounted write-protect assembly. This rotation brings position tab 124 into engagement with optoelectronic device 122. The light path is interrupted which indicates that the diskette has been fully inserted and that the notch is covered. The processor control circuit recognizes the disk is not protected and alterations of existing information or the addition of new information is permitted. A second interlock acknowledges the fact that the clamping action has been effected. This is accomplished by tab 128 which is a lower extension of the rear vertical member 30 of lower link 108. As the clamping handle is rotated into its fully clamped position, the lower link 108 moves to its most rearward position and in so doing, positions tab 128 within the light path of an optoelectronic device 126 so as to interrupt the light path of the optoelectronic device 126. Once the status of the interlocking devices has been determined, and it is known that the clamping action has been effected normal operation can be obtained.

When the disk has been fully inserted and clamped solenoid 52 is energized by control circuity on circuit board 120, and the action of the solenoid plunger 49 accomplishes two results. First, it is used as a keeper to ensure that head lifter assembly 180 is held down so that the spring bias of the head assembly will cause the engagement of the record/playback head 54 with the exposed disk surface 64 of cartridge 66. A technique for providing this function will be decribed in detail subsequently. The second is to prevent inadvertent release of the clamping mechanism and partial ejection of the disk. Solenoid plunger movement is as shown by the dotted arrow, FIG. 6, and its operation causes a pivotal lock-out member 148 to pivot around pivot assembly 154 so as to bring the distal end 150 into alignment with distal end 147 of release member 132. Lock-out member 148 is held in the inoperative position normally by coil spring 158 which is attached at one end to spring support 156 that is a part of pivotal assembly 154 and at the other end thereof, spring 158 is attached to holding pin 160 mounted to the support member 96. With solenoid 52 energized, extension arm 162 is engaged thereby and, thus, forces extension member 152 at the other end thereof in the direction shown by the solid arrow. This positions the lock-out member 148 in its lock-out position and prevents the release button 50, extension 132 and release tab 146, which is attached thereto, from engaging extension arm 103 of the overcenter link 102.

When the lock-out member 148 is in its normal position, release button 50 may be pushed inwardly which allows the slideable member 134, attached to release button extension 132, to move backwardly along the guide path established by guide pin 136 and guide slot 138. This brings tab 146 into engagement with extension arm 103 causing the link 102 to be moved into its release position. When this occurs, coil spring 46, attached to support member 48 of upper link 38, rapidly draws the upper and lower links forward toward the face plate 16. This forward motion rotates the clamping member 44 upwardly removing the clamping force, and causes the clamp assembly to move away from the central aperture 62 of the disk, thereby freeing it for removal. As link 38 moves rapidly forward, the cartridge engaging surface 114 of vertical extension 30 of the lower links 108 is also moved rapidly forward and strikes the rear edge of the disk with sufficient force so as to drive the disk partially out from the disk guide slot 18 and to permit removal therefrom.

Figures 5, 6:
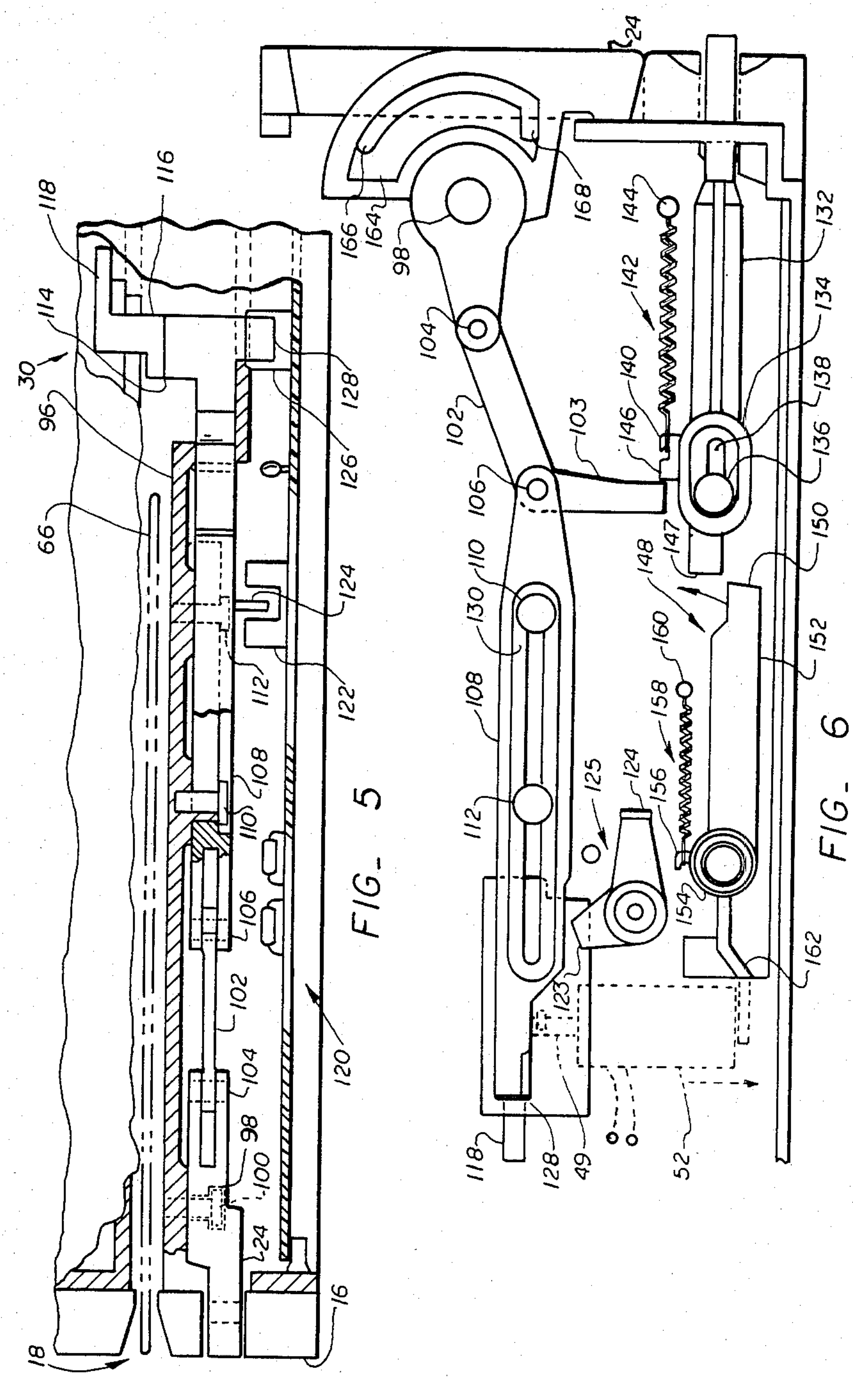
FIG. 5 is a side view of the lower link illustrating the clamping handle (24), vertical extension (30), position tab (124) of the write-protect assembly and clamping tab (128); and circuit board (120) on which the electrical circuits for control and processing are mounted.
FIG. 6 is a plan view of the lower linkage and illustrates the over-center link used to lock the mechanism in the clamped condition; the release lever for initiating the ejection of the disk, and the interlock which prevents movement of the release lever while read/write functions are in progress.

Referring to FIGS. 6 and 7, it may be seen that this rapid movement of the upper link 38 is translated via extension 30 to the lower link 108 and, in turn, to overcenter link 102 via pivot pin 104 and thence to handle 24. This causes the clamp handle 24 to rotate toward its normal unclamped, recessed position. To insure that the clamp handle is fully rotated to its unclamped, recessed position an arcuate recess 164 in the bottom of handle 24 includes a spring guide slot 166 along the outer edge of said arcuate recess and also includes a latching slot 168. The distal end 170 of a wire spring 172 rides along the guide slot 166 as the handle is rotated by spring force from spring 46 toward its recessed position. As the handle turns, the distal end 170 of wire spring 172 engages with slot 168 and at this point supplies sufficient spring pressure to force the handle to its fully recessed position. As is seen, the wire spring is held at its proximal end by a spring holding assembly 174 and such arrangements are well known in the art.

Referring to FIGS. 8 and 9 along with the following description the operation of the ejector mechanism in conjunction with the head lifter assembly 180 may be understood. In order to allow the disk to be readily ejected it is necessary to lift the head 54 so that it is free and clear of the disk prior to the time that the cartridge engaging surface 114 of vertical extension 30 strikes the rear edge of cartride 66 upon release. This is accomplished by means of cam 37 formed in the top surface of upper link 38. For this purpose, a head lifter assembly 180 is employed and it includes the lifter rocker arm 182, lifting lip 183, which is a part of the distal end of lifter rocker arm 182 which is attached to a shaft 184. Shaft 184 is mounted in guides 186 to hold the head lifter assembly 180 in position. The lifter rocker arm 182 and hence the lifting lip 183 are spring-biased upward by torsion spring 188 which has one end thereof held by spring holding tab 190.

As may be seen in FIGS. 8 and 9, the lifting lip 183 is positioned under the head lift member 51 of head assembly 54, and because of the spring bias, an upward force is applied to the head, lifting it from the surface of disk 64. As may be seen in FIG. 9, a keeper arm 192 extends downwardly from the rear end of shaft 184 and is positioned so that the distal end thereof may be engaged by solenoid keeper 49. When solenoid 52 is energized, the solenoid plunger moves to the left, shown in solid lines, and keeper 49 holds the distal end of the keeper arm 192 in a position such as to prevent any lifting action on head 54, thereby allowing head 54 to contact the surface of disk 64. When the disk is to be released from the guide slot, solenoid 52 is deenergized which causes the solenoid plunger to move toward the right as shown in FIG. 9 and take the position for the keeper 49 as shown by the dotted lines. Spring 188 then is effective to force the head lifter assembly upward away from the disk surface.

The end portion of the lock-out arm portion 162 is shown against the end of lock-out arm portion 47 of the solenoid plunger. Motion of solenoid plunger end 47 is also shown dotted. This movement permits the actuating member 162 to move so that the pivot lock-out member 148 is positioned so as to permit actuation of a release button 50.

Upon release, the link 38 travels rapidly forward because of spring pressure as described hereinabove, and in so doing, cam surface 37 engages the underside of lifter rocker arm 182 causing it to rise as shown in FIG. 9 by the dotted lines. As shown, the lifting lip 183 moves the head lifter arm 51 upward so as to move the head assembly 54 clear of the disk and cartridge prior to the time the cartridge engaging surface 114 strikes the rearward edge of the disk 66. The cam 37 is positioned so as to engage the lifter rocker arm 182 and hold the head assembly 54 up above the disk engaging level until a floppy disk is fully inserted into the guide slot 18 of the disk drive assembly 10.

A compact disk drive assembly has been described in which inadvertent clamping or release of the disk has been precluded. The first is accomplished by the recessing of the clamping handle which is not available except when the disk is fully inserted into the guide slot and against the end stops thereof. The release is precluded during operation because of the lock-out mechanism which prevents the release button from being actuated until the operating functions have been completed. Because of spring loading, the linkages involved with insertion and clamping of the disk provide a force, upon release, by pushing the release button, that strikes against the rear edge of the cartridge containing said disk and applies an ejection force thereto. This moves the disk cartridge to a position which is accessible from the guide slot 18 at the face plate position. At the same time, spring forces are employed which cause the handle to rotate fully into its recessed unclamped position.

While there has been described what is presently considered to be the preferred embodiment of the invention, it will be understood that various modifications may be made therein, and it is intended to cover in the appended claims all such modifications as fall within the true spirit and scope of the invention.

What is claimed is:

1. A disk drive having a frame including a front end, left and right side walls disposed at opposite ends of said front end, a support member connected between said side walls and said front end of said frame, a face plate connected outward of and adjacent to said front end so as to be substantially perpendicular to said support member, having an aperture in said support member and a spindle extending through said aperture, said spindle connected to said drive and including a first inner wall defining a first recess therein and an abutment surface for supporting an associated flexible magnetic disk adjacent to a central opening thereof, a mechanism for appropriately providing either a centering and clamping action or an ejection force to said flexible magnetic disk, said mechanism comprising:

a guide slot in said face plate for accepting and fully enclosing said flexible magnetic disk, said guide slot including alignment means and end stops which the disk rests against when fully inserted;

rotatable means for centering and clamping said disk to said spindle, said rotatable means being positioned in axial alignment with said spindle;

rotor means adapted for connection to said rotatable means for driving said rotatable means between a disk clamping position and a disk releasing position as said rotor means turn in a clockwise or counterclockwise direction;

spring-loaded means for supplying a clockwise or a counterclockwise turning motion to said rotor means, whereby said rotatable means may be brought into centering and clamping engagement with said disk so as to center it with and clamp it to said abutment surface of said spindle; and means for locking said spring-loaded means when said rotatable means is in clamping engagement with said disk and said spindle.

2. A mechanism as set forth in claim 1 including means for releasing said locking means whereby said spring-loaded means first unclamps said disk and then forces said disk outward so that a portion of the disk is accessible at the entrance to the guide slot permitting removal thereof.

3. A mechanism as set forth in claim 1 comprising:

a head carriage assembly for carrying a record/-playback head along a disk surface; and drive means for moving said head carriage assembly so as to place said record/playback head at selected positions on said disk.

4. A mechanism as set forth in claim 3 wherein said drive means comprises:

guide means for causing said head carriage assembly to move linearly along a prescribed path;

a lead screw having one and other ends, said one end being adapted for connection to said head carriage assembly so that rotation of said lead screw moves said carriage assembly linearly along said prescribed path; and means for precisely rotating said lead screw so as to precisely position said record/playback head on said disk.

5. A mechanism as set forth in claim 4 wherein said means for precisely rotating said lead screw comprises:

a first stepper motor connected to said lead screw to provide coarse positioning;

a second stepper motor; and a linear multiplier adapted for connection between said lead screw and said second stepper motor to effect precise positioning of said record/playback head.

6. A mechanism as set forth in claim 3 comprising:

bias means for holding the head carriage assembly against a surface of a disk only when the disk is in place and record or playback operation is in process; and means for overcoming said bias means during insertion and ejection of said disk so that said head carriage assembly does not engage the disk.

7. A mechanism as set forth in claim 6 wherein said means for overcoming comprises:

a rocker arm having a lip which is adapted to engage with a lifter arm on said head carriage assembly; and camming means for lifting said rocker arm during the insertion and ejection of said disk, whereby said lifter arm is raised.

8. A mechanism as set forth in claim 1 wherein a cover connected to said frame includes a second inner wall defining a cylindrical opening through said cover from top to bottom, said opening being centered with and spaced above said spindle, and said second inner wall including helical guide slots.

9. A mechanism as set forth in claim 8 wherein said rotor means has a top and a bottom and has an outer diameter adapted to fit in said cylindrical opening, said outer diameter including radial projections thereon adapted to mate with said helical guide slots in said second inner wall, and to drive said rotor means between said top and said bottom as said rotor means is turned clockwise or counterclockwise.

10. A mechanism as set forth in claim 9 wherein said rotor means includes a rotational clamping member rotatably connected with said rotor means, said rotational clamping member including an upper diameter and a chamfered lower portion adapted for centering said disk by engaging the central opening of said disk and positioning it centrally over said spindle, said lower portion extending into said first recess and against said first inner wall of said spindle when in a clamped position, a clamping surface between said upper diameter and said lower portion, said clamping surface being in a parallel relationship with said disk and said spindle abutment surface, and means for engaging with said spring-loaded means whereby said rotor means may be moved between clamped and unclamped positions.

11. A mechanism as set forth in claim 9 wherein a helical aperture is formed along one of said helical guide slots, said helical aperture being closed at the upper end by the top of said cover, but open at said bottom thereof.

12. A mechanism as set forth in claim 11 wherein said rotor means includes a radial extension of said radial projection which mates with and extends through said helical aperture, said extension having a knob at the distal end thereof.

13. A mechanism as set forth in claim 12 wherein said spring loaded means comprises:

an upper link arm having at one end thereof, a semi-circular end adapted to mate with said knob and at the other end thereof, a slot, and intermediate the ends, a spring support member;

spring means having an end connected to said spring support member and the other end connected to a spring hook on said cover, for holding said rotor means in the unclamped position.

14. A mechanism as set forth in claim 13 wherein said spring loaded means further comprises:

a lower slideable link having at one end thereof a clamping handle, which is recessed in a channel in said face plate when either in the unclamped or fully clamped condition, at the other end is a right angled member connected at substantially right angles to said lower slideable, a lower portion of an upper part of which is formed to engage with a leading edge of said disk during its insertion, said lower slidable link being moved forward under full insertion of said disk so as to force said clamping handle out of said channel, thus, permitting access to said clamping handle and permitting clamping of said disk only when it is in the fully inserted position.

15. A mechanism as set forth in claim 14 wherein said means for locking comprises:

said lower slideable link having at an end thereof said right angled member and having an other end;

said handle having an interior extension; and an over-center link pivotally connected to the interior extension of said handle and said other end of said slideable link, said over-center link being translated into a locking condition when said handle is rotated to the fully clamped position, said over-center link including a release arm which extends from the pivotal connection with said lower slideable link.

16. A mechanism as set forth in claim 15 including means for releasing said means for locking, which comprises:

a release button extending through said face plate;

a release linkage actuated by said release button so as to engage with said release arm when said release button is pressed so as to unlock said overcenter link, which causes said spring-loaded means to first unclamp said disk, and then force said disk outward so that a portion is accessible at the entrance to said guide slot permitting removal thereof.

17. A mechanism as set forth in claim 16 including means for preventing inadvertant release of said disk comprising:

a pivotally mounted lock-out member having one end and an other end positioned so that said one end thereof is proximate a distal end of said release linkage, said lock-out member being biased so as normally to be clear of said release linkage distal end;

means for over-coming said bias so as to bring said one end into alignment with said release linkage distal end so as to prevent inadvertant release.

18. A mechanism as set forth in claim 17 including means for preventing operation of said disk drive except when said disk is completely inserted and fully clamped.

19. A mechanism as set forth in claim 18 wherein said means for preventing operation comprises:

a downwardly extending lower part of said right-angled member of said lower link;

a circuit board including a control circuit, and a microprocessor; and a first optoelectronic device having a light path positioned so as to be interrupted by said downwardly extending lower part when the mechanism is in a fully clamped position, whereby a first control signal is transmitted to the associated microprocessor which enables the control circuit.

20. A mechanism as set forth in claim 19 including means for recognizing when a disk is write-protected.

21. A mechanism as set forth in claim 20 wherein said means for recognizing a write-protect condition of a disk, which comprises:

a moveable member biased in a first position and being moved to a second position only when said disk is write-protected, said moveable member having a downwardly extending arm portion that terminates just above the plane of said circuit board; and a second optoelectronic device mounted on said circuit board, said second optoelectronic device including a light path positioned to be interrupted by said downwardly extending arm portion only when said moveable member is moved to said second position so as to interrupt said light path and cause a second control signal to be transmitted to said microprocessor whereby a write-protect status of said disk is recognized.

22. A mechanism as set forth in claim 21 comprising:

a head carriage assembly for carrying a record/-playback head along a disk surface; and drive means for moving said head carriage assembly so as to place said record/playback head at selected positions on said disk.

23. A mechanism as set forth in claim 22 wherein said drive means comprises:

guide means for causing said head carriage assembly to move linearly along a prescribed path;

a lead screw having one and other ends, said one end being adapted for connection to said head carriage assembly so that rotation of said lead screw moves said carriage assembly linearly along said prescribed path; and means for precisely rotating said lead screw so as to precisely position said record/playback head on said disk.

24. A mechanism as set forth in claim 23 wherein said means for precisely rotating said lead screw comprises:

a first stepper motor connected to said lead screw to provide coarse positioning;

a second stepper motor; and a linear multiplier adapted for connection between said lead screw and said second stepper motor to effect precise positioning of said record/playback head.

25. A floppy disk drive including a drive spindle having a first inner wall defining a first recess therein and an abutment surface for supporting a flexible magnetic disk which is in place, a rotational clamping member which is moveable away from or toward said abutment surface so as to clamp said flexible magnetic disk against said abutment surface for rotation with said spindle for the purpose of information recording and retrieval, comprising:

turning means for moving said rotational clamping member toward or away from said abutment surface, said turning means moving said rotational clamping member at a right angle to a plane parallel to that of said flexible magnetic disk when in place;

spring-loaded means for supplying clockwise or counterclockwise rotational motion to said turning means, whereby said rotational clamping member may be brought into centering and clamping engagement with said disk so as to center it with and clamp it to said abutment surface of said spindle; and means for locking said spring-loaded means when said rotational clamping member is in clamping engagement with said disk and spindle.

26. A floppy disk drive as set forth in claim 25 including means for releasing said locking means whereby said spring-loaded means first unclamps said disk then forces said disk outward so that a portion of the disk is accessible for removal thereof.

* * * * *